Dec. 20, 1938.    J. J. RING    2,141,018

NEEDLE VALVE

Filed Aug. 17, 1936

Inventor
J. J. Ring
by G. J. DeWein
Attorney

Patented Dec. 20, 1938

2,141,018

UNITED STATES PATENT OFFICE 2,141,018

NEEDLE VALVE

Joseph J. Ring, Wauwatosa, Wis., assignor to Allis-Chalmers Manufacturing Company, Milwaukee, Wis., a corporation of Delaware Application August 17, 1936, Serial No. 96,340

4 Claims. (Cl. 251—75)

This invention relates to improvements in valves and particularly to valves which are required to be operated while subject to high pressure on one side of the valve body.

When fluids under pressure are to be controlled as for example in pump discharge lines or in the penstocks of hydraulic turbine installations under head, the valves in such lines or penstocks, when in the closed position, are subjected to high pressure on one side thereof and are under only very low or even atmospheric pressure on the other side thereof. In the larger sizes of such valves which have already attained diameters of twenty-five or more feet, it is impractical to provide operating means of sufficient power to secure opening of such valves against the high pressure and, even if such operating means were provided, opening of the valve under the unbalanced condition of high pressure on one side thereof and a very low pressure on the other side thereof would produce such strains and stresses in the structure as would damage or even destroy the valve and the connected pipe line. The valve must accordingly be so constructed that, or separate means must be provided by which, the pressure on the two sides of the valve may be balanced whereupon the valve requires operating means capable of exerting only sufficient force to open the valve under pressure for such distance as will allow balancing of the pressures and a further sufficient force to lift the weight of the valve body after the pressures on opposite sides thereof are balanced.

It is, therefore, one of the objects of the present invention to provide a valve for use under high pressures and of such construction as to provide for balancing of the pressures acting on the valve body immediately upon movement of the valve body from its seat.

Another object of the invention is to provide a valve for the control of fluid under high pressure in which the pressure acting on the valve body is balanced by the transmission of fluid pressure through the valve itself upon movement thereof from its seat.

Figure 1:
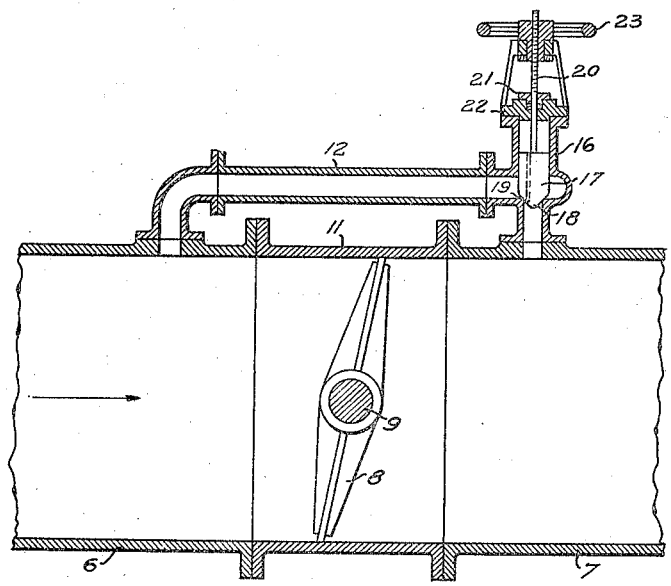
Figure 2:
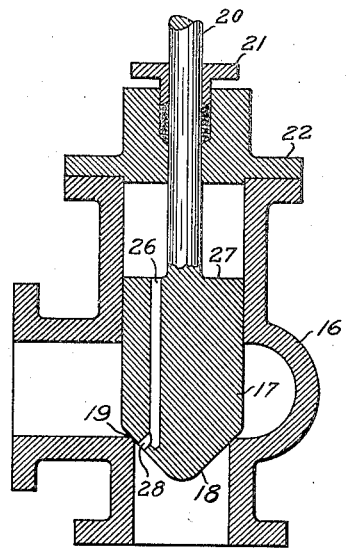

Objects and advantages, other than those above set forth, will be apparent from the following description when read in connection with the accompanying drawing, in which:

Fig. 1 is a vertical sectional view through a portion of a pipe line for conveying fluid under pressure to be controlled by a valve shown as being of the so-called butterfly type and provided with a bypass controlled by a valve constructed according to the present invention to allow for balancing the pressures in the pipe line on the two sides of the butterfly valve; and Fig. 2 is a detailed vertical sectional view of the pressure balancing valve of the present invention.

Referring more particularly to the drawing by characters of reference, the reference numerals 6 and 7 designate the several sections of a pipe line for the purpose of conveying a fluid under pressure. The flow of fluid through the pipe line 6, 7 in the direction of the arrow shown in Fig. 1, is controlled by a valve 8 shown as being of the oscillating or so-called butterfly type mounted on a shaft 9 extending through a valve casing 11 inserted between the two pipe sections 6, 7. The valve 8 is operable manually or by any of the known power operating means which are usual and are therefore not shown. Assuming that section 6 of the pipe line is under pressure and that pipe line section 7 is empty, it will be understood that the forces acting on the valve 8 are of such magnitude as to make opening of the valve 8 impractical, regardless of the power of its operating means, so long as the pressures on the two sides of the valve are widely unbalanced. To permit balancing of the pressures on the two sides of the valve 8, a bypass 12 is provided by which fluid under pressure may flow from the pressure filled section 6 to the empty section 7 of the pipe line.

The bypass 12 is provided with a valve controlling the flow of fluid through the bypass and comprising a casing 16 which is in the form of a cylinder closed at one end and connected at its open end with the pipe line section 7 and a valve body 17 movable within the valve casing 16 and substantially in the form of a piston with a somewhat conical end of which the surface 18 forms the valve face seating on the conical seat 19 within the valve casing 16. The stem 20 of the valve 17 extends through a suitable sealing gland 21 in the cover 22 of the valve casing 16 and is threaded for engagement with the threaded hub of a wheel 23 which is suitably mounted on the valve casing for rotation only thus providing means by which the valve body 17 may be positively raised and lowered.

The valve body 17 is provided with a passage 26 extending from the upper surface 27 of the valve to adjacent the lower surface 18 thereof. The valve body 17 is also provided with a passage 28 extending from the lower end of the passage 26 to and through the valve face 18 at a point closely adjacent the portion of such valve face seating in the valve casing 16. The passage 28 is at an angle to the conical seating face 18 of the valve. Although such angle has been shown in the drawing as a right angle, it will be understood that the angularity and the size of the passage 28 will be determined by the pressure conditions under which the valve acts. The two passages 26 and 28 thus connect the chamber above the valve 17 within the cylinder or valve casing 16 with the pipe section 7 to relieve the pressure in such chamber when the valve 17 is in the closed position. When the valve 17 is closed and therefore is in the position shown in the drawing, only the small annular area of the valve 17 above the casing seat 19, that is the difference between the area of the valve body 17 and the seat 19, is under the pressure of the fluid within the pipe section 6, which pressure is not of such magnitude that it cannot be resisted by the usual material of which valves are constructed. When it is desired to open valve 17 for the purpose of balancing the pressure on the two sides of valve 8, the valve 17 is raised from its seat for only a very small distance. Fluid under pressure then flows through the valve casing 16 over the seat 19 into the pipe section 7. Such fluid pressure is also transmitted through the passages 28 and 26 into the chamber above the valve surface 27 until the pressures on the valve surfaces 18 and 27 are balanced whereupon the valve 17 may be readily opened to its fullest extent to fill the pipe section 7 and thus to balance the pressure on opposite sides of the valve 8. When it is required to close the valve 17, such action may be readily carried out for the reason that downward movement of valve 17 toward its seat 19 merely allows flow of fluid pressure into the chamber above the valve face 27 thus equalizing the pressures on all of the surfaces of such valve. Such equalized pressure is present even when the valve 8 is closed and the pipe section 7 is discharged, at least until the valve face 18 closely approaches its seat 19 at which time the lift on the annular portion of the valve 17 above the seat 19 is overcome by operating the hand wheel 23.

It will, of course, be understood that the valve 17 may itself be used to control the flow of fluid under pressure through the pipe line 6, 7 instead of acting merely as an auxiliary pressure balancing valve for a main valve such as the butterfly valve 8.

Although but one embodiment of the present invention has been illustrated and described it will be apparent to those skilled in the art that various changes and modifications may be made therein without departing from the spirit of the invention or from the scope of the appended claims.

It is claimed and desired to secure by Letters Patent:

1. In a valve subject to high pressure differences on opposite sides thereof, a casing connected with high pressure upstream and low pressure downstream spaces and having a conical seating surface therein, a valve body having a conical end surface seating in and being movable into a chamber defined by said casing, said valve having a passageway therethrough from downstream of and adjacent to the conical seating surface in said casing and extending to the upper surface of said valve body to equalize the pressure acting on the end surfaces of said valve body at a predetermined rate, and means for moving said valve body relative to the seat therefor in said casing.

2. In a valve subject to high pressure differences on opposite sides thereof, a casing connected with high pressure upstream and low pressure downstream spaces and having a conical seating surface therein, a valve body having a conical end surface seating in and being movable into a chamber defined by said casing, said valve having a passageway therethrough at an angle to and extending from downstream of the seating portion of the conical seating surface to the upper surface of said valve body to equalize the pressure acting on the surfaces of said valve body at a predetermined rate, and means for moving said valve body relative to the seat thereof in said casing.

3. In a valve subject to high pressure differences on opposite sides thereof, a casing connected with high pressure upstream and low pressure downstream spaces and having a conical seating surface therein, a valve body having a substantially conical end surface seating in said casing and being movable into a chamber defined by said casing and exposing only a small annular area above the seating surface to the lifting high pressure when said valve is closed, said valve having a passageway therethrough from downstream the seating surface and extending to the upper surface of said valve body to equalize the pressure acting on the surfaces of said valve body at a predetermined rate, and means for moving said valve body relative to the seat therefor in said casing.

4. In a valve subject to high pressure differences on opposite sides thereof, a casing connected with high pressure upstream and low pressure downstream spaces and having a conical seating surface therein, a valve body having a substantially conical end surface seating in said casing and being movable into a chamber defined by said casing and exposing only a small annular area above the seating surface to the high lifting pressure when said valve is closed, said valve having a passageway therethrough from downstream of and at an angle to and extending from closely adjacent the lower seating surface to the upper surface of said valve body to equalize the pressure acting on the surfaces of said valve body at a predetermined rate, and means for moving said valve body relative to the seat therefor in said casing.

JOSEPH J. RING.